(12) United States Patent
Westermeier et al.

(10) Patent No.: US 10,406,678 B2
(45) Date of Patent: Sep. 10, 2019

(54) APPARATUS AND METHOD FOR HANDLING ARTICLES

(71) Applicant: KRONES Aktiengesellschaft, Neutraubling (DE)

(72) Inventors: Christian Westermeier, Oberaudorf (DE); Josef Unterseher, Rohrdorf (DE); Manuel Kollmuss, Raubling (DE); Marco Ehberger, Bad Aibling (DE); Michael Hartl, Raubling (DE); Peter Zeiner, Raubling (DE)

(73) Assignee: KRONES Aktiengesellschaft, Neutraubling (DE)

( * ) Notice: Subject to any disclaimer, the term of this patent is extended or adjusted under 35 U.S.C. 154(b) by 268 days.

(21) Appl. No.: 15/527,093

(22) PCT Filed: Nov. 9, 2015

(86) PCT No.: PCT/EP2015/076082
§ 371 (c)(1),
(2) Date: May 16, 2017

(87) PCT Pub. No.: WO2016/078953
PCT Pub. Date: May 26, 2016

(65) Prior Publication Data
US 2018/0229359 A1    Aug. 16, 2018

(30) Foreign Application Priority Data
Nov. 17, 2014   (DE) .................. 10 2014 223 410

(51) Int. Cl.
*B25J 9/02* (2006.01)
*B25J 17/02* (2006.01)
*B25J 9/00* (2006.01)

(52) U.S. Cl.
CPC .......... *B25J 9/0051* (2013.01); *B25J 17/0266* (2013.01)

(58) Field of Classification Search
CPC ........ B25J 9/0027; B25J 9/003; B25J 9/0045; B25J 9/0051; B25J 9/0096; B25J 9/023;
(Continued)

(56) References Cited

U.S. PATENT DOCUMENTS 4,976,582 A * 12/1990 Clavel .................... B25J 9/1065
108/138
6,543,987 B2 * 4/2003 Ehrat .................... B25J 15/0616
414/729
(Continued)

FOREIGN PATENT DOCUMENTS

CN    203752661 U    8/2014
CN    104057442      9/2014
(Continued)

OTHER PUBLICATIONS

PCT/EP2015/076082—International Preliminary Report on Patentability dated May 23, 2017.
(Continued)

*Primary Examiner* — Adam D Rogers
(74) *Attorney, Agent, or Firm* — Simmons Perrine Moyer Bergman PLC (57) ABSTRACT

The present invention includes an apparatus (1) and a method for handling articles and comprises an upper suspension (3) with at least three rotatably driven positioning arms (5), where the positioning arms (5) each comprise at least two arm sections (7, 9) that are swivelable relative to each other and operated independently of one another. A manipulator (32) comprises one or more clamping jaws (34, 36) and is mechanically coupled to the positioning arms (5) such the manipulator can be positioned by movement of one
(Continued)

or more of the positioning arms (5). At least one drive shaft (12) is linked non-rotatingly to the manipulator, such that the manipulator is rotated by movement of the at least one drive shaft (12). Rotation of the at least one drive shaft (12) also controls the one or more clamping jaws (34, 36) via the at least one actuating shaft (14).

15 Claims, 4 Drawing Sheets

(58) Field of Classification Search
CPC ........ B25J 9/026; B25J 9/044; B25J 17/0266; B25J 17/0291
See application file for complete search history.

(56) References Cited

U.S. PATENT DOCUMENTS

| | | | | |
|---|---|---|---|---|
| 6,896,473 | B2 * | 5/2005 | Schuler | B25J 17/0266 |
| | | | | 403/109.1 |
| 7,204,168 | B2 * | 4/2007 | Najafi | A61B 8/00 |
| | | | | 74/471 XY |
| 8,047,093 | B2 | 11/2011 | Kinoshita et al. | |
| 8,109,173 | B2 | 2/2012 | Kinoshita et al. | |
| 8,210,068 | B2 | 7/2012 | Feng | |
| 9,764,482 | B2 * | 9/2017 | Ilch | B25J 17/0266 |
| 2008/0141813 | A1 * | 6/2008 | Ehrat | B25J 9/103 |
| | | | | 74/490.01 |
| 2013/0142608 | A1 | 6/2013 | Zhang et al. | |
| 2014/0096636 | A1 * | 4/2014 | Hirano | F16C 3/035 |
| | | | | 74/490.01 |
| 2015/0202779 | A1 | 7/2015 | Ilch | |
| 2016/0311632 | A1 * | 10/2016 | Westermeier | B25J 9/0051 |

FOREIGN PATENT DOCUMENTS

| | | | | |
|---|---|---|---|---|
| CN | 103240729 | B | 4/2015 | |
| CN | 103231371 | B | 10/2015 | |
| CN | 103846911 | B | 6/2016 | |
| DE | 10204513 | | 8/2003 | |
| DE | 10204513 | A1 * | 8/2003 | ............. B66C 1/447 |
| DE | 102008023069 | A1 * | 11/2009 | ......... B25J 17/0266 |
| DE | 102010006155 | A1 * | 8/2010 | ......... B25J 17/0266 |
| DE | 102013208082 | | 11/2014 | |
| DE | 102015220413 | A1 * | 4/2017 | ............ B25J 9/0051 |
| DE | 102015225332 | A1 * | 6/2017 | ............ B25J 9/0012 |
| EP | 2388216 | | 11/2011 | |
| EP | 2799190 | A2 * | 11/2014 | ............ B25J 9/0051 |
| EP | 2799190 | B1 | 5/2016 | |
| JP | 2012045710 | | 3/2012 | |
| WO | WO-2014053115 | A1 * | 4/2014 | .......... B25J 17/0266 |

OTHER PUBLICATIONS

Corresponding Chinese Patent Application—First Office Action dated Nov. 26, 2018.
DE 10 2014 223 410.7 German Patent Application—German Search Report dated Aug. 12, 2015.
PCT/EP2015/076082 European PCT Application—International Search Report dated Jan. 27, 2016.

\* cited by examiner

APPARATUS AND METHOD FOR HANDLING ARTICLES

CLAIM OF PRIORITY

The present application is a national stage application of International Application PCT/EP2015/076082, filed Nov. 9, 2015, which in turn claims priority to German Application DE 10 2014 223 410.07, filed Nov. 17, 2014, all of which are incorporated by reference.

FIELD OF THE INVENTION

The present invention relates to an apparatus as well as to a method for handling articles, such as bundles, piece goods, or the like.

BACKGROUND OF THE INVENTION

Known packaging or palletizing facilities for stacking and palletizing objects, such as packages or bundles made of a plurality of articles, for example beverage containers, usually have horizontal conveying devices with conveyor belts on which the piece goods or bundles are conveyed in uninterrupted or in irregular succession to a handling device. There, the individual piece goods or bundles are shifted, aligned, and/or rotated in order to bring them into a suitable spatial arrangement, which forms a basis for pushing together the piece goods or bundles to form stackable layers of piece goods or bundles in grouping stations arranged downstream.

Different methods for rotating the bundles are used in current filling and packaging lines, which can have suitable movable stops or two conveyor belts moving at different speeds, for example. The known handling devices can also be provided with grippers, which are suspended at a gantry system, for example, and which can be shifted, rotated, and additionally moved in a vertical direction within a defined range of movement in order to be able to lift up individual piece goods or bundles for the purpose of rotating and/or shifting them. The grippers can also be arranged on the arms of multi-axis robots, for example, which are placed alongside the horizontal conveying devices.

For the purpose of relocating and/or aligning piece goods or bundles when handling them in practice in such a way, they are seized, lifted up, and transferred to a desired position or in a desired alignment within a grouping. Numerous gripping apparatuses are already known from prior art for this purpose, such as from EP 2 388 216 A1. This known gripping apparatus has two gripping arms, which are horizontally spaced apart from each other and arranged via mechanical connections at an intermediately arranged carrier. The gripping arms can be moved toward each other in order to seize objects. Under a defined application of force, the gripping arms are furthermore detachable from the carrier in a vertical direction and away from the carrier. At the free end, both gripping arms have clamping jaws, which are in surface contact with the objects when seizing those particular objects.

A further gripping apparatus is shown in DE 102 04 513 A1, for example. Here, a plurality of gripping arms located opposite each other is guided within a middle part. One gripping arm is shiftable in relation to another gripping arm by means of a positioning member such that both gripping arms can be closed. Provided at the lower ends of the gripping arms, at the sides facing toward each other, are gripping sections for gripping building material packages.

In addition, there are further handling devices for gripping, shifting, rotating, and/or relocating articles or bundles, which handling devices are based on so-called delta robots or parallel kinematic robots, which, in a three-arm design, are also referred to as tripods. Each of the arms of such a tripod or delta robot consists of an upper arm swivelably arranged at the base so as to be driven about a frame-fixed swivel axis and of a lower arm that is articulatedly connected to the upper arm and to the coupling element. In this case, the lower arm is designed to be passive and without a drive for being swiveled in relation to the upper arm or to the coupling element. One or more of the lower arms can be connected to the particularly associated upper arms and to the coupling element by way of ball joints, for example. Such an individual lower arm is freely swivelable and has no inherent stability. All upper arms of a delta robot are each mounted to be driven swivelably about swivel axes that are located preferably within a common plane. Three lower arms connected to the coupling element and to their particularly associated upper arm in any position form a triangle of forces, which can only be moved when the three upper arms synchronously perform the swiveling movements calculated for them about their frame-fixed swivel axes. Two or more swivel axes can run parallel to each other; as a rule, all swivel axes have two intersection points with other swivel axes.

For the purpose of guiding the coupling element in at least one specified alignment relative to the base, at least one of the lower arms can consist of two linkage elements, also termed ulna and radius, which form a parallelogram linkage. In this context, the coupling element serves as a working platform, which is also referred to in practice as a tool center point (TCP). A manipulator can be arranged at this TCP in the form of gripping arms or the like handling devices, for example, which are advanceable toward each other, such that the manipulator can seize articles, bundles, or the like piece goods and rotate, shift, or lift them from a support surface.

The manipulator arranged on the working platform or the TCP can optionally be mounted to be rotatable in order to align the manipulator or in order to be able to perform a desired rotation of the articles or piece goods. Instead of a drivable rotatable mounting of the manipulator on the coupling element, it is generally also conceivable to arrange the manipulator non-rotatably at the coupling element and to twist the entire coupling element relative to the base with a corresponding compensation movement of the arms by means of the telescopic shaft. This is, however, associated with the disadvantage of having a limited angle of rotation for the coupling element. This limitation results from reaching the end stops of the articulated connections of the upper arms and/or of the coupling element with the lower arms and/or with the mutual contact of adjacent lower arms.

Such handling devices with tripods are known from DE 10 2010 006 155 A1, from DE 10 2013 208 082 A1, and from U.S. Pat. No. 8,210,068 B1. These devices are highly precise and can moreover be moved quickly for handling the particular articles in question. Tripods as known from the prior art have movable manipulators in order to be able to receive the particular articles and release them after handling or positioning. The manipulators can be controlled pneumatically, hydraulically, or electrically, for example, and for this purpose, line connections are coupled to the corresponding manipulator. These line connections can be a hindrance with regard to the freedom of movement of the tripod. In addition, the line connections must be installed securely to exclude the risk of damaging line connections during operation of the tripod. The complicated coupling between the manipulator and an associated actuator results in a complex structure and a partially restricted freedom of movement for tripods as known from the prior art.

It is therefore an objective of the present invention to provide an apparatus for handling articles that is accordingly characterized by a simple structure and a high degree of freedom of movement. It is furthermore an objective to provide a method allowing the handling of articles with a high degree of freedom of movement. In addition, the method should be easy to implement.

SUMMARY OF THE INVENTION

The above objects are fulfilled by an apparatus and a method comprising the features in the independent claims. Further advantageous embodiments of the invention are described in the relevant dependent claims.

The apparatus according to the invention is designed for handling articles, such as bundles, piece goods, or the like. The articles can be formed, in particular, by beverage containers and/or by a plurality of beverage containers assembled in a bundle.

The apparatus furthermore comprises an upper suspension, to which at least three rotatably driven positioning arms are fastened. For the purpose of driving the at least three positioning arms, each of them can have an own actuator associated with it, which is preferentially configured as an electric motor and which effects a rotating movement of the positioning arms. The positioning arms can each be flange-mounted directly to their particularly associated actuator. The actuators can be supported by the upper suspension. In particular, the actuators can then be arranged at the upper suspension in a hanging position. The axes of rotation of the at least three positioning arms can run parallel to each other. The actuators of the at least three positioning arms can be linked to a control unit, which specifies a movement of one or more of the at least three positioning arms for the specific positioning of the manipulator, which is to be described in more detail below.

The at least three positioning arms each consist of at least two arm sections, which are swivelable relative to each other and which can be operated independently of one another. Swivel axes of at least two arm sections, which are swivelable relative to each other, can run parallel to each other. In particularly preferred embodiments, each lower arm section is formed by at least two parallel linkages in mechanical connection with the manipulator. The manipulator can thus be moved by way of the at least three positioning arms.

The previously mentioned manipulator of the apparatus according to the invention comprises one or more clamping jaws for gripping the articles and it is mechanically coupled with the at least three positioning arms. In this context, in each case at least one joint can be expediently arranged between the at least three positioning arms and the manipulator. In this manner, a position of the manipulator can be specified by a movement of one or more of the at least three positioning arms. In particularly preferred embodiments, the at least three positioning arms are articulatedly connected to a support ring, which is furthermore mechanically coupled with the manipulator. The mechanical coupling between the support ring and the manipulator can allow a relative twist of the manipulator in relation to the support ring.

The apparatus according to the invention also comprises at least one drive shaft that is linked non-rotatingly to the manipulator, such that the manipulator can be rotated by the at least one drive shaft. In particularly preferred embodiments, the position of the at least one drive shaft can be selected such that the at least one drive shaft is located between all of the at least three positioning arms or, as the case may be, such that all of the at least three positioning arms are arranged around the at least one drive shaft. The at least one drive shaft can in each case be linked to an actuator described in more detail below as well as to the manipulator by way of a cardanic type joint. In simple embodiments, the particular cardanic type joint can be formed as cardan joint. The term "cardanic type joint", however, is to be understood in a broad sense such that ball joints, for example, and/or other cardanic type joints can be provided in the context of conceivable embodiments of the apparatus according to the invention.

In addition, at least one actuating shaft is provided as part of the apparatus according to the invention, by which said at least one actuating shaft the one or more clamping jaws for temporarily gripping and releasing articles can be controlled. For this purpose, the one or more clamping jaws can be in mechanical engagement with the at least one actuating shaft.

The apparatus according to the invention moreover comprises at least one driving member which is linked non-rotatingly to the at least one drive shaft and by which a mechanical coupling is formed between the at least one drive shaft and the at least one actuating shaft, which mechanical coupling serves for rotatingly driving the at least one actuating shaft about the longitudinal axis of the at least one drive shaft. The at least one actuating shaft can thus be configured to orbit the longitudinal axis of the drive shaft like a satellite, moving in a preferably circular path, when the drive shaft performs a rotating movement. In this context it is conceivable that the satellite completely orbits at least one drive shaft. It is furthermore possible that the satellite does not completely orbit the drive shaft and at a certain point moves in the opposite direction back toward its original starting position.

According to the invention, the at least one actuating shaft designed for controlling the one or more clamping jaws for gripping and releasing articles is driven, thus resulting in the possibility of doing without complicated line connections in the area of the manipulator. Since the at least one actuating shaft is driven rotatingly, a rotation process of the manipulator is not impeded by the at least one actuating shaft.

It can be provided in particularly preferred embodiments that the longitudinal axis of the at least one actuating shaft and the longitudinal axis of the at least one drive shaft together enclose an acute angle. The at least one actuating shaft and the at least one drive shaft can therefore have a non-parallel orientation. For this purpose, the at least one actuating shaft can be linked to the one or more clamping jaws for gripping the articles by way of a cardanic type joint. Furthermore, the at least one actuating shaft can be coupled at its upwardly facing end to a further cardanic type joint. It can also be provided, however, for the longitudinal axis of the at least one actuating shaft and the longitudinal axis of the at least one drive shaft to be oriented parallel to each other.

The at least one drive shaft can furthermore be linked to an actuator, which is positioned non-rotatingly on the upper suspension. For example, an axis of rotation of the at least one drive shaft can extend through the actuator and/or through the center of gravity of the actuator. Where appropriate, the actuator can thus be flange-mounted by way of an intermediately arranged cardanic type joint to the at least one drive shaft.

In addition, the one or more clamping jaws can comprise at least two opposite clamping jaws, which are selectively advanced or opened when being controlled by way of the at least one actuating shaft. It is possible, for example, that only one of the oppositely located clamping jaws is actively moved by the at least one actuating shaft, whereas no active movement of the particular opposite clamping jaw is effected by the at least one actuating shaft. In other conceivable embodiments, the apparatus can have one transmission element or a plurality of transmission elements for converting a rotating movement of the at least one actuating shaft to an active adjustment of all of the at least two opposite clamping jaws. The particular articles can be gripped by the clamping jaws and subsequently relocated by a movement of the manipulator. In this context it is conceivable that the articles are transported on a horizontal conveying device, are gripped by the apparatus or, as the case may be, by the manipulator, and are relocated on the horizontal conveying device. In this context, the articles can, for example, be delayed or accelerated in relation to a transport speed of the horizontal conveying device, and, where appropriate, they can be rotated and/or relocated diagonally to a conveying direction of the horizontal conveying device.

It is also possible that a plurality of the at least two clamping jaws located opposite each other is associated with an own actuating shaft, by which the particular clamping jaw can be actively adjusted. The invention is therefore not limited to embodiments with only one actuating shaft. Embodiments are in fact conceivable where the apparatus comprises a plurality of actuating shafts, which can each control one or more clamping jaws for temporarily gripping and releasing articles.

It is moreover possible that the at least one drive shaft and the at least one actuating shaft are mechanically linked to each other by at least one torque transmission, where the at least one actuating shaft is impingeable with a compulsory self-rotation about its longitudinal axis during the rotating movement of the at least one drive shaft. It is thus possible that the at least one drive shaft is impinged with a torque by its associated actuator, and that the torque is transmitted from the at least one drive shaft to the at least one actuating shaft, thereby resulting in a self-rotation of the at least one actuating shaft.

It is, for instance, possible that the one or more clamping jaws of the manipulator grips one article or a plurality of articles. If it is intended to subsequently rotate the manipulator by way of the at least one drive shaft, it is necessary to rotatingly move the at least one actuating shaft in the course of the rotary movement of the manipulator in order to prevent the articles from being released by the manipulator while it is rotating. If the one or more clamping jaws are clamping jaws located opposite each other, then their relative position is maintained due to a rotation of the at least one actuating shaft during a rotation of the manipulator such that the articles can continue to be gripped by way of both clamping jaws during a rotation of the manipulator.

It is additionally possible that the at least one actuating shaft is impingeable with the rotational frequency increased in relation to the at least one drive shaft. An increased rotational frequency of the at least one actuating shaft may be necessary in order to continue to grip the articles even during a rotary movement of the manipulator, as mentioned above.

For the purpose of impinging the at least one actuating shaft with its self-rotation, the torque transmission can, in particular, have at least one drive belt construction and/or drive chain construction, which couples the at least one drive shaft and the at least one actuating shaft with each other for time-synchronous rotary movement. In alternative embodiments, gear connections or, as the case may be, a gear transmission, for example, can be provided, which couple the at least one drive shaft and the at least one actuating shaft with each other for time-synchronous rotary movement.

It is also possible that the at least one drive shaft and the at least one actuating shaft are formed to be telescopically extendable and retractable. For this purpose, the at least one drive shaft and the at least one actuating shaft can each comprise at least two telescopically extendable and retractable housing parts or, as the case may be, at least two housing parts that are telescopically connected to each other. It is clear to the addressed skilled person that in other conceivable embodiments, the at least one drive shaft and the at least one actuating shaft can each likewise be formed from three, four, or more than four telescopically extendable and retractable housing parts or, as the case may be, from three, four, or more than four housing parts that are telescopically connected to each other. In particular, the at least two telescopically extendable and retractable housing parts can each have a hollow cylindrical design, at least in sections.

The invention moreover relates to a method for handling articles, such as bundles, piece goods, or the like. Features described above relating to various embodiments of the apparatus according to the invention can in this context likewise be provided in conceivable embodiments of the method according to the invention. In addition, features that will be described below regarding various embodiments of the method according to the invention can be provided in conceivable embodiments of the apparatus according to the invention.

The method according to the invention is implemented using an apparatus, which comprises an upper suspension to which at least three rotatably driven positioning arms are fastened. The at least three positioning arms each consist of at least two arm sections, which are swivelable relative to each other and which can be operated independently of one another or, as the case may be, which can be adjusted independently of one another. Each particular adjustment can be specified by way of a control unit.

The apparatus for implementing the method according to the invention further has a manipulator, which comprises one or more clamping jaws for gripping the articles and which is mechanically coupled to the at least three positioning arms, such that a position of the manipulator can be specified by a movement of one or more of the at least three positioning arms.

The apparatus for implementing the method according to the invention is also provided with at least one drive shaft, which is non-rotatably linked to the manipulator, and with at least one actuating shaft, by way of which the one or more clamping jaws for temporarily gripping and releasing articles can be controlled.

The at least one actuating shaft is mechanically coupled with the at least on drive shaft by way of a driving member such that the manipulator and the at least one actuating shaft are rotatingly moved about the longitudinal axis of the at least one drive shaft upon the rotating movement of the at least one drive shaft. The driving member can, in particular, be formed as a rotating arm, which extends away from the at least one drive shaft toward the at least one actuating shaft and which grips the at least one actuating shaft for the purpose of rotatingly driving it. For this purpose, the driving member or, as the case may be, the rotating arm can have an opening through which the at least one actuating shaft passes.

In particularly preferred embodiments the at least one drive shaft and the at least one actuating shaft can be mechanically linked to each other by at least one torque transmission, which causes the at least one actuating shaft to rotate about its longitudinal axis upon the rotating movement of the drive shaft. It is in particular possible that the torque transmission causes the at least one actuating shaft to rotate about its longitudinal axis at a rotational frequency increased in relation to the at least one drive shaft.

It is moreover conceivable that the at least one actuating shaft is rotatingly moved about the longitudinal axis of the at least one drive shaft by a rotation angle of at least 360°. Synchronously herewith, the manipulator can likewise be rotatingly moved by a rotation angle of at least 360°. If articles are intended to be rotated by the manipulator by slightly more than 180°, it can be useful to continue to rotate the manipulator after the release of the articles in the same direction of rotation by a total of 360° and, in doing so, return it to the original rotary position. With embodiments offering the possibility of rotating the manipulator and the at least one actuating shaft by 360°, the method can be carried out with an increased throughput for handling articles. It can be provided in the context of the method that the manipulator is only rotated in one direction of rotation and that a rotation in the opposite direction of rotation is consistently not performed.

It is additionally possible that the one or more clamping jaws for temporarily gripping and releasing articles is formed by at least two clamping jaws located opposite each other, which clamping jaws can be selectively advanced or opened upon being controlled by way of the at least one actuating shaft. As mentioned above, it is possible in this instance that only one of the at least two clamping jaws located opposite each other is actively moved by the at least one actuating shaft. It is also conceivable that both of the at least two clamping jaws located opposite each other are actively moved by the at least one actuating shaft or, as the case may be, are shifted relative to each other, in order to grip the particular articles.

Furthermore, it is possible that the at least one actuating shaft and the at least one drive shaft are each adjusted telescopically upon operating one or more of the at least three rotatably driven positioning arms.

In preferred embodiments, the articles can be transported on a horizontal conveying device while they are being handled, and in the process, they can be gripped by the manipulator. After gripping, the manipulator can effect a rotation and/or a lateral offset diagonally to the transport direction of the horizontal conveying device and/or a delay and/or an acceleration of the particularly gripped articles in relation to a transport speed of the horizontal conveying device.

BRIEF DESCRIPTION OF THE FIGURES

In the following passages, the attached figures further illustrate exemplary embodiments of the invention and their advantages. The size ratios of the individual elements in the figures do not necessarily reflect the real size ratios. It is to be understood that in some instances various aspects of the invention may be shown exaggerated or enlarged in relation to other elements to facilitate an understanding of the invention.

DETAILED DESCRIPTION OF THE INVENTION

The same or equivalent elements of the invention are designated by identical reference characters. Furthermore and for the sake of clarity, only the reference characters relevant for describing each of the figures are provided. It should be understood that the detailed description and specific examples, while indicating preferred embodiments, are intended for purposes of illustration only and are not intended to limit the scope of the invention.

Figure 1:
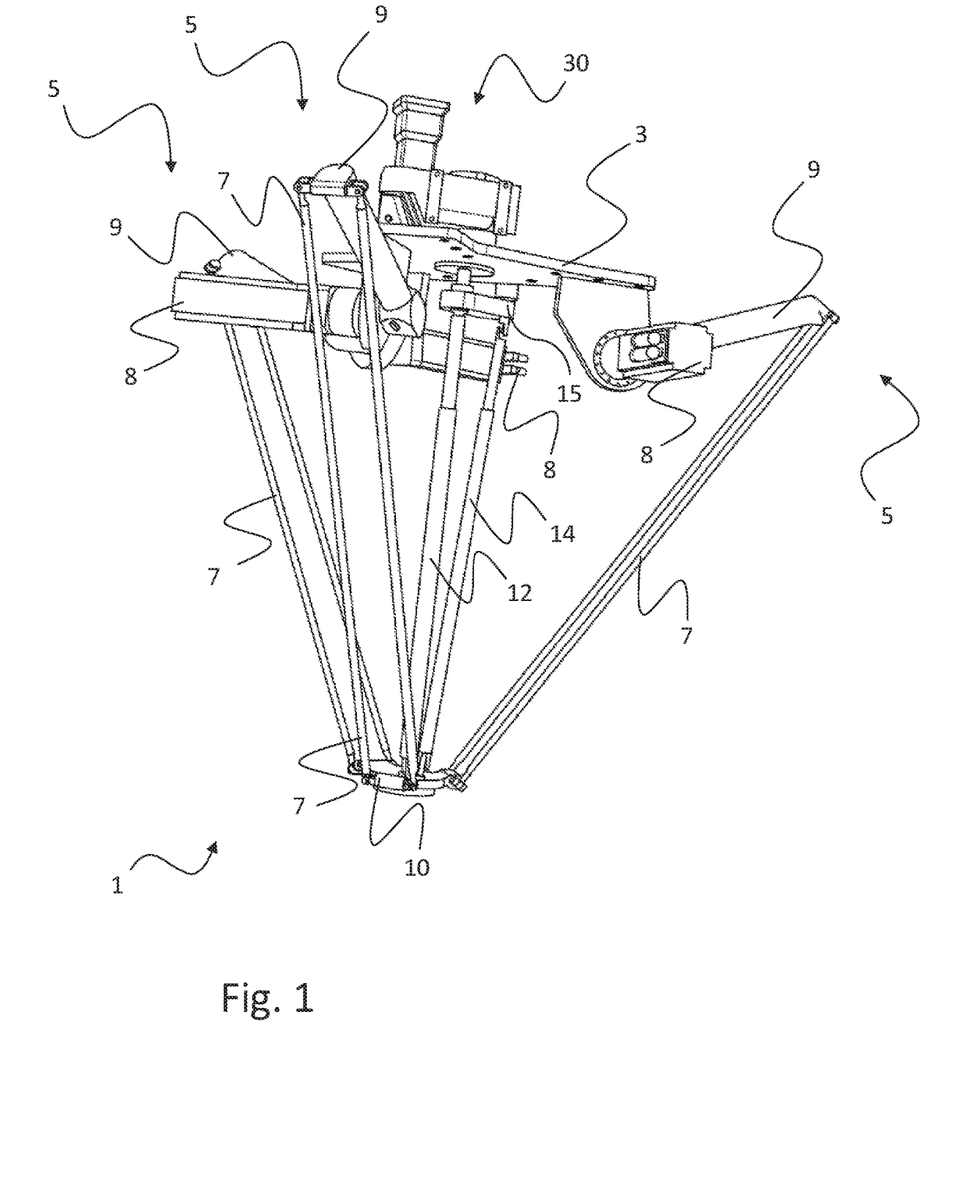
FIG. 1 shows a schematic perspective view of an embodiment of an apparatus according to the invention.

FIG. 1 shows a schematic perspective view of an embodiment of an apparatus 1 according to the invention. The apparatus 1 is configured to grip, rotate, and relocate articles such as beverage containers, which have been assembled to bundles and which are not illustrated in FIG. 1.

As is discernible in FIG. 1, the apparatus 1 has an upper suspension 3. Three positioning arms 5 are fastened to the upper suspension 3, each so as to be rotatable by an associated drive 8. The rotating movement of the positioning arms 5 in this context is carried out such that their axes of rotation run parallel to each other.

Furthermore, the three positioning arms 5 consist of at least two arm sections 7 and 9, which are swivelable relative to each other, with the lower arm sections 7 each being formed from two linkages oriented parallel to each other. The upper arm section 9 is in each case linked to its particularly associated drive 8 or, as the case may be, is flange-mounted to its particularly associated drive 8.

In addition, the three positioning arms 5 can be moved independently of one another. For this purpose, all drives 8 are linked to a control unit (not illustrated in FIG. 1), which specifies the movement of the positioning arms 5 and controls the drives 8.

Figure 4:
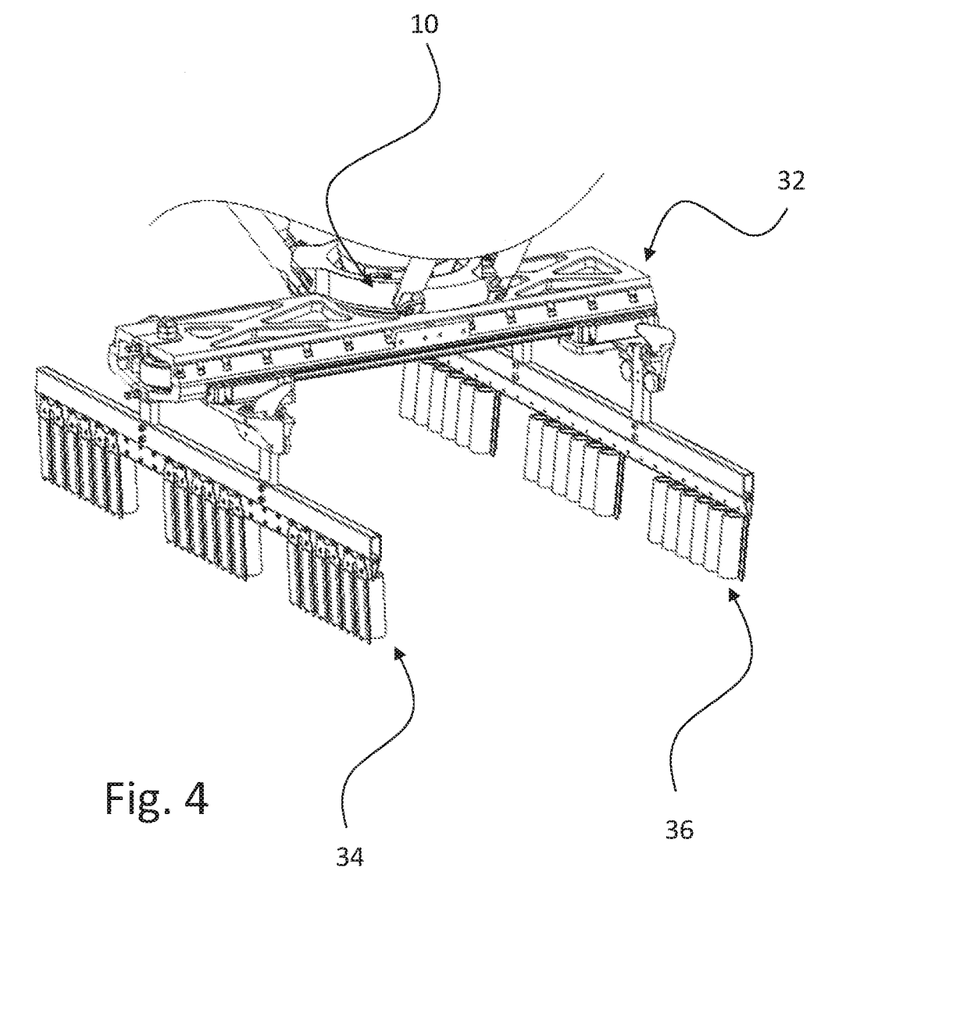
FIG. 4 shows a detailed view of the manipulator and one or more clamping jaws.

At the lower end of the three positioning arms 5, a manipulator 32 (as seen in FIG. 4) is linked to the three positioning arms 5 such that the manipulator 32 can be moved for handling articles by movement of the three positioning arms 5. In FIG. 1 a base 10 is shown, to which the manipulator 32 is fastened or supported. In particularly preferred embodiments, the manipulator 32 can have two clamping jaws 34, 36 located opposite each other (as seen in FIG. 4), for which the relative spacing for gripping articles can be specified.

Also shown in FIG. 1 is a drive shaft 12 linked non-rotatingly to the manipulator 32. Due to the non-rotating connection, the manipulator 32 rotates together with the drive shaft 12 or, as the case may be, about the longitudinal axis of the drive shaft 12, when the drive shaft 12 is rotatingly moved.

The actuating shaft 14 adjacent to the drive shaft 12 in FIG. 1 is configured to control one or more clamping jaws 34, 36 (of the manipulator) for temporarily gripping and releasing articles. For this purpose, the actuating shaft 14 can be rotatingly moved by an actuator, which is not illustrated in FIG. 1. Since the manipulator 32 is positioned by movement of the positioning arms 5, and since the drive shaft 12 as well as the actuating shaft 14 are mechanically coupled with the manipulator 32, the drive shaft 12 and the actuating shaft 14 can be telescoped in order to move together with the manipulator 32.

A mechanical coupling for rotatingly driving the actuating shaft 14 about the longitudinal axis of the drive shaft 12 is formed between the drive shaft 12 and the actuating shaft 14 by a driving member 15 linked non-rotatingly to the drive shaft 12. Due to the coupling of the two shafts 12 and 14 by way of the driving member 15, the actuating shaft 14 thus orbits about the drive shaft 12 or, as the case may be, about the longitudinal axis of the drive shaft 12, when the drive shaft 12 is rotatingly moved. The drive shaft 12 is rotatingly driven by the actuator 30 (cf. FIG. 2), which is positioned non-rotatingly on the upper suspension 3.

Since the one or more clamping jaws 34, 36 for gripping and releasing articles are controlled by the actuating shaft 14, which, upon rotation of the drive shaft 12, orbits said drive shaft 12, a rotating movement of the manipulator 32 is not impeded by line connections, which are provided for operating in apparatuses known from the prior art. Furthermore, a rotation by 360° of the particular articles can be carried out by the manipulator 32 such that the apparatus 1 shown in FIG. 1 has a high degree of flexibility in handling articles.

Figure 2:
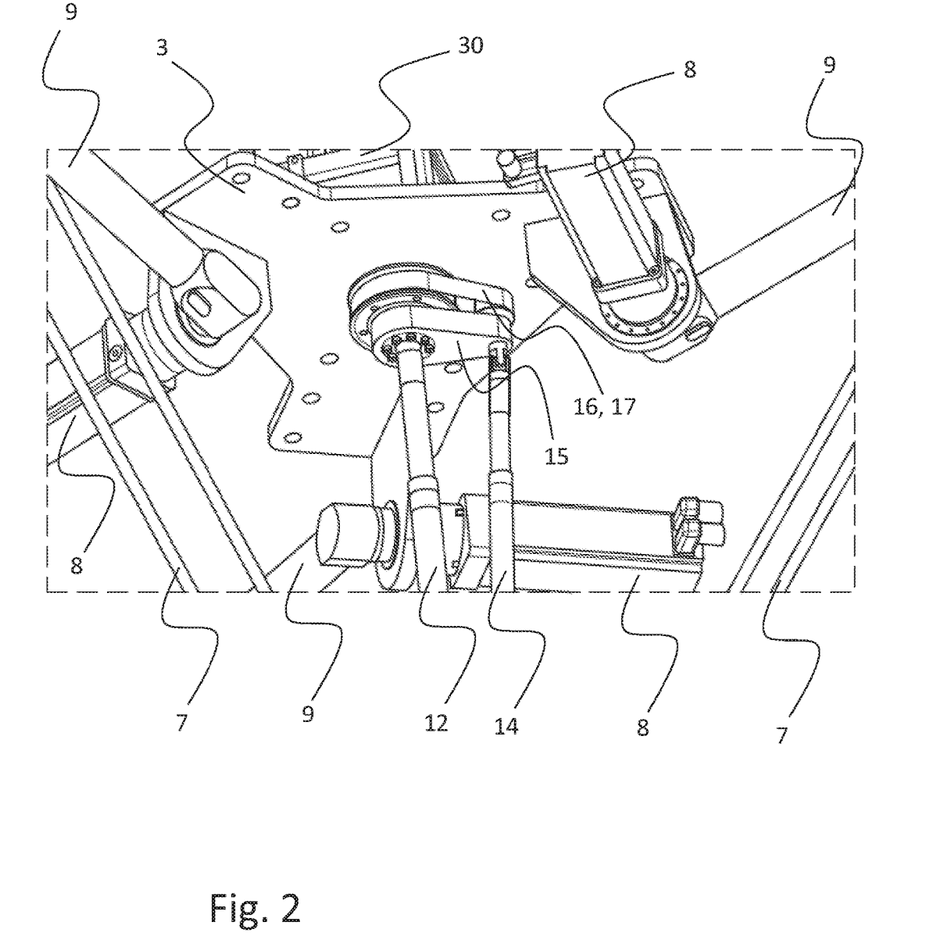
FIG. 2 shows a schematic detailed view of an upper part of the apparatus from FIG. 1.

FIG. 2 shows a schematic detailed view of an upper part of the apparatus 1 from FIG. 1; and also discernible from FIG. 2 is that the drive shaft 12 and the actuating shaft 14 are linked to each other by way of a torque transmission 16, which is formed as a drive belt construction 17. For the purpose of clarity, the torque transmission 16 or, as the case may be, the drive belt construction 17 is not illustrated in FIG. 1. A torque is transmitted from the drive shaft 12 to the actuating shaft 14 by the torque transmission 16 such as by the drive belt construction 17, such that the actuating shaft 14 rotates synchronously with the drive shaft 12 or, as the case may be, is rotatingly moved about its own axis. The coupling between the drive shaft 12 and the actuating shaft 14 in this context is formed such that a rotational frequency of the actuating shaft 14 is configured to be greater than a rotational frequency of the drive shaft 12.

Figure 3:
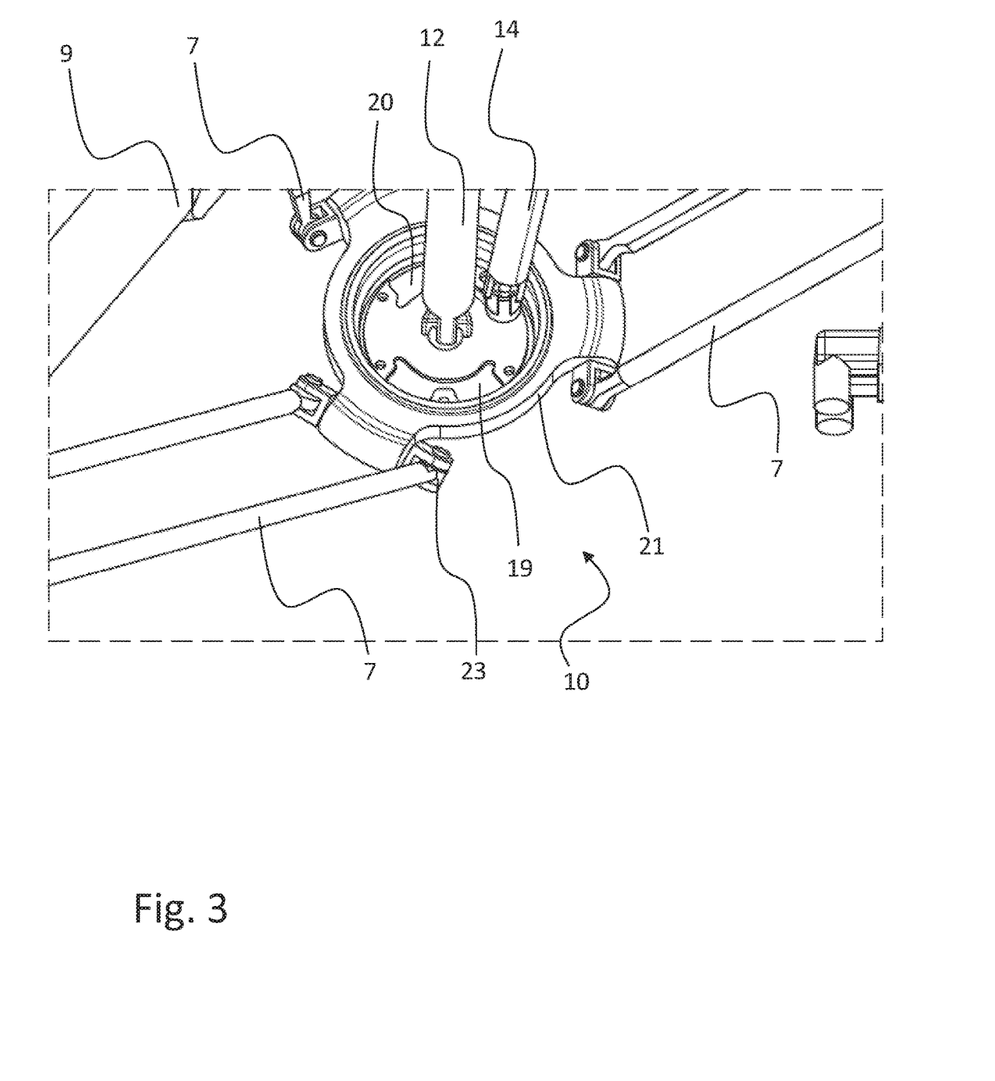
FIG. 3 shows a schematic detailed view of a lower part of the apparatus from FIGS. 1 and 2.

FIG. 3 additionally shows a schematic detailed view of a lower part of the apparatus 1 from FIGS. 1 and 2. The drive shaft 12, as well as the actuating shaft 14, are also discernible in FIG. 3. The actuating shaft 14 is guided in a recess 20 in the base 10, which recess 20 limits a rotary movement of the actuating shaft 14 about the longitudinal axis of the drive shaft 12.

The base 10, by which the manipulator 32 is supported, consists of a support ring 21 as well as a rotating flange 19. Support ring 21 and rotating flange 19 can be rotated relative to each other about the rotational axis of the drive shaft 12. The positioning arms 5 or, as the case may be, the particular lower sections 7 of the positioning arms 5 are linked to the support ring 21 of the base 10 by way of joints 23. The rotating flange 19 is coupled non-rotatingly with the manipulator 32 such that the manipulator 32 is rotated relative to the support ring 21 of the base 10 upon a rotational movement of the drive shaft 12. The drive shaft 12 is fastened to the rotating flange 19 by way of a cardan joint.

The invention has been described with reference to a preferred embodiment. Those skilled in the art will appreciate that numerous changes and modifications can be made to the preferred embodiments of the invention and that such changes and modifications can be made without departing from the spirit of the invention. It is, therefore, intended that the appended claims cover all such equivalent variations as fall within the true spirit and scope of the invention.

LIST OF REFERENCE CHARACTERS

1 Apparatus
3 Suspension
5 Positioning arm
7 Lower arm section
8 Drive
9 Upper arm section
10 Base
12 Drive shaft
14 Actuating shaft
15 Driving member
16 Torque transmission
17 Drive belt construction; drive chain construction
19 Rotating flange
20 Recess
21 Support ring
23 Joint
30 Actuator
32 Manipulator
34,36 Clamping jaws

The invention claimed is:

1. An apparatus (1) for handling articles, including bundles, or goods, comprising:
    an upper suspension (3), to which at least three rotatably driven positioning arms (5) are fastened, wherein the at least three rotatably driven positioning arms (5) each consist of at least two arm sections (7, 9) that are swivelable relative to each other and that can be operated independently of one another;
    a manipulator (32) that comprises one or more clamping jaws (34, 36) for temporarily gripping and releasing the articles and that is mechanically coupled to the at least three positioning arms (5) such that a position of the manipulator (32) can be specified by a movement of one or more of the at least three positioning arms (5);
    at least one drive shaft (12) that is linked non-rotatingly to the manipulator (32) such that the manipulator (32) can be rotated by the at least one drive shaft (12);
    at least one actuating shaft (14) which controls the one or more clamping jaws (34, 36); and
    at least one driving member (15) linked non-rotatingly to the at least one drive shaft (12), wherein the at least one driving member (15) forms a mechanical coupling between the at least one drive shaft (12) and the at least one actuating shaft (14), wherein the mechanical coupling rotatingly drives the at least one actuating shaft (14) about the longitudinal axis of the at least one drive shaft (12).

2. The apparatus of claim 1 wherein the longitudinal axis of the at least one actuating shaft (14) and the longitudinal axis of the at least one drive shaft (12) together enclose an acute angle or wherein the longitudinal axes of the at least one actuating shaft (14) and of the at least one drive shaft (12) are oriented parallel to each other.

3. The apparatus of claim 2 wherein the at least one drive shaft (12) is linked to an actuator (30), which is positioned non-rotatingly on the upper suspension (3).

4. The apparatus of claim 3 wherein the one or more clamping jaws (34, 36) comprise at least two clamping jaws located opposite each other.

5. The apparatus of claim 4 wherein the at least one drive shaft (12) and the at least one actuating shaft (14) are mechanically linked to each other by at least one torque transmission (16), wherein the at least one actuating shaft (14) is impingeable with a compulsory self-rotation about its longitudinal axis upon the rotating movement of the at least one drive shaft (12).

6. The apparatus of claim 5 wherein the at least one actuating shaft (14) is impingeable with a rotational frequency increased in relation to the at least one drive shaft (12).

7. The apparatus of claim 5 wherein the at least one torque transmission (16) comprises at least one drive belt construction or drive chain construction (17), which couples the at least one drive shaft (12) and the at least one actuating shaft (14) with each other for approximately time-synchronous rotary movement.

8. The apparatus of claim 5 wherein the at least one torque transmission (16) comprises at least one gear transmission, which couples the at least one drive shaft (12) and the at least one actuating shaft (14) with each other for approximately time-synchronous rotary movement.

9. The apparatus of claim 1 wherein the at least one drive shaft (12) and the at least one actuating shaft (14) are telescopically extendable and retractable.

10. A method for handling articles, including bundles, or goods, comprising:
specifying the position of a manipulator (32) by moving one or more of at least three positioning arms (5) mechanically coupled to the manipulator (32), wherein the manipulator comprises one or more clamping jaws (34, 36); and
rotatingly moving the manipulator (32) and at least one actuating shaft (14), about a longitudinal axis of at least one drive shaft (12), upon the rotating movement of the at least one drive shaft (12), wherein the at least one actuating shaft (14) is mechanically coupled with the at least one drive shaft (12) by way of a driving member (15);
wherein the at least three positioning arms (5) are fastened to an upper suspension (3);
wherein the at least three positioning arms (5) each comprise at least two arm sections (7, 9) that are swivelable relative to each other and that can be operated independently of one another; and
wherein the at least one drive shaft (12) is linked non-rotatingly to the manipulator (32).

11. The method of claim 10 wherein rotating movement of the at least one actuating shaft (14) is caused by the rotating movement of the at least one drive shaft (12) due to the at least one drive shaft (12) and the at least one actuating shaft (14) being mechanically linked to each other by at least one torque transmission (16).

12. The method of claim 11 wherein rotating movement of the at least one actuating shaft (14) has a rotational frequency higher than a rotational frequency of the at least one drive shaft (12).

13. The method claim 10 wherein rotating movement of the at least one actuating shaft (14) is through a rotation angle of at least 360°.

14. The method claim 10 further comprising advancing or opening the one or more clamping jaws (34, 36), comprising at least two clamping jaws located opposite each other, rotating movement of the at least one actuating shaft (14).

15. The method claim 10 further comprising adjusting telescopically the at least one actuating shaft (14) and/or the at least one drive shaft (12) upon operating one or more of the at least three positioning arms (5).

* * * * *